United States Patent [19]

Gabas et al.

[11] Patent Number: 5,259,265
[45] Date of Patent: Nov. 9, 1993

[54] CONTROL CABLE LENGTH SELF-ADJUSTING MECHANISM

[75] Inventors: Carlos Gabas, Barcelona; Agustin Roca, Rubi, both of Spain

[73] Assignee: Pujol Y Tarrago S.A., Rubi, Spain

[21] Appl. No.: 828,928

[22] PCT Filed: Apr. 9, 1991

[86] PCT No.: PCT/ES91/00020
§ 371 Date: Mar. 16, 1992
§ 102(e) Date: Mar. 16, 1992

[87] PCT Pub. No.: WO91/19110
PCT Pub. Date: Dec. 12, 1991

[30] Foreign Application Priority Data

May 31, 1990 [ES] Spain .................... 9001506

[51] Int. Cl.⁵ .................................................. F16C 1/10
[52] U.S. Cl. ................................... 74/502.4; 74/502.6
[58] Field of Search ............. 74/501.5 R, 502.4, 502.6

[56] References Cited

U.S. PATENT DOCUMENTS

| | | | |
|---|---|---|---|
| 3,710,645 | 1/1973 | Bennett | 74/502.4 |
| 4,294,133 | 10/1981 | Hurley | 74/501.5 R |
| 4,669,330 | 6/1987 | Stocker | 74/501.5 R |
| 4,676,119 | 6/1987 | Spease | 74/502.6 |
| 4,694,706 | 9/1987 | Lichtenberg et al. | 74/502.4 X |
| 4,793,206 | 12/1988 | Suzuki | 74/501.5 R |
| 4,805,479 | 2/1989 | Brightwell | 74/502.4 |
| 4,841,806 | 6/1989 | Spease | 74/502.6 X |
| 4,854,185 | 8/1989 | Lichtenberg et al. | 74/502.4 X |
| 4,872,367 | 10/1989 | Spease | 74/502.4 X |
| 4,903,541 | 2/1990 | Shiota | 74/502.6 X |

FOREIGN PATENT DOCUMENTS

| | | |
|---|---|---|
| 242964 | 10/1987 | European Pat. Off. . |
| 2014129 | 1/1971 | Fed. Rep. of Germany . |
| 2111125 | 6/1972 | France . |
| WO91/17365 | 11/1991 | PCT Int'l Appl. ............... 74/502.6 |
| 8803905 | 12/1988 | Spain . |

*Primary Examiner*—Rodney H. Bonck
*Assistant Examiner*—Ryan W. Massey
*Attorney, Agent, or Firm*—Michael J. Striker

[57] ABSTRACT

A control cable length self-adjusting device has a main body member anchored to a motor vehicle structure, an adjusting stud through which an unsheathed steel cable can longitudinally slide and which has one end arranged for receiving a sheath of the steel cable and having a peripheral flange, a mechanical retaining element provided for retaining the adjusting stud, and a spring element permanently pressing the adjusting stud, the main body member being substantially parallelepipedic and hollow, the main body having one main surface provided with a central longitudinal extension which carries members for anchoring to a motor vehicle structure, the extension and the main body having a longitudinal through hole through which the adjusting stud can snugly slide and which has an elongated recess forming a seat for the adjusting stud and also has a central upper opening, the main body member having another main surface which is opposite to the first mentioned main surface and has an inlet port of the longitudinal through hole, the main body member also having two remaining side surfaces provided with substantially quadrangular apertures and transverse channel-like notches.

6 Claims, 1 Drawing Sheet

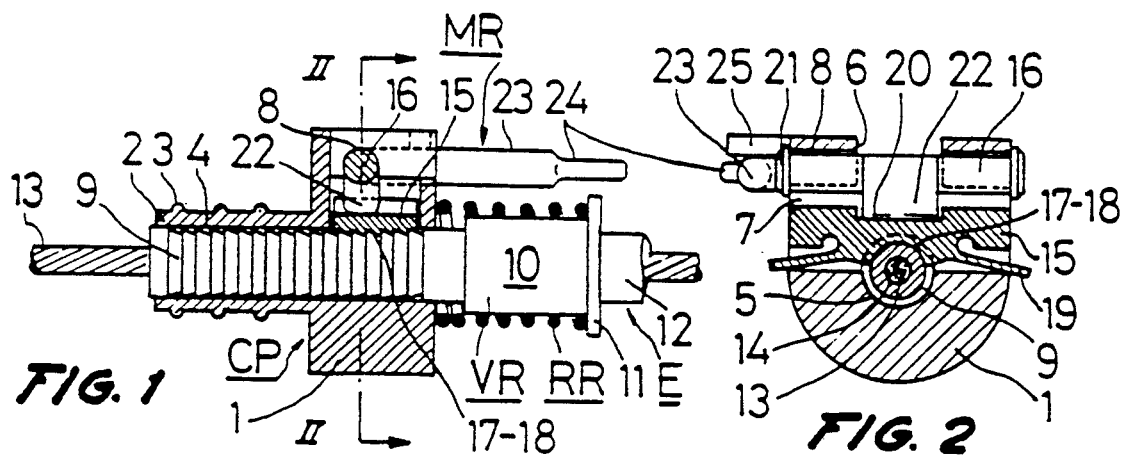
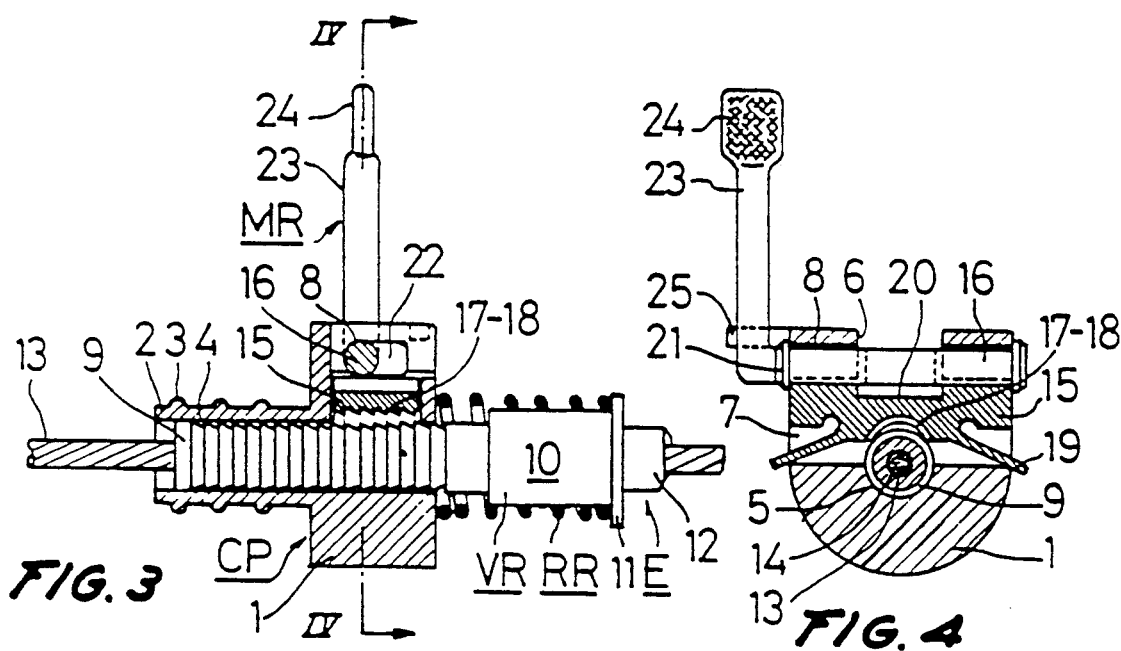
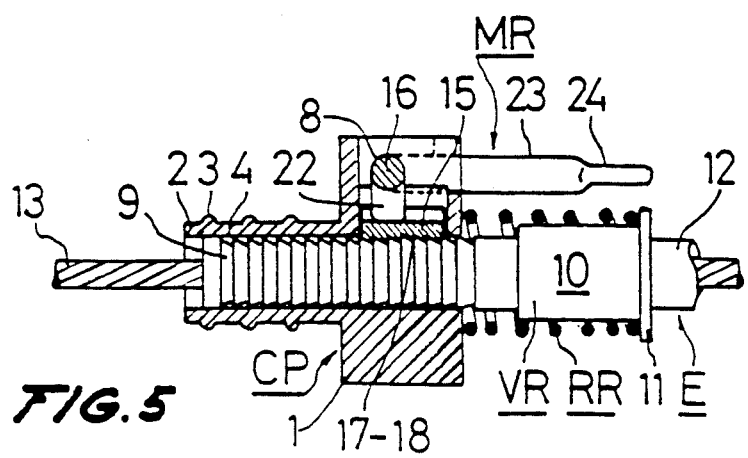

CONTROL CABLE LENGTH SELF-ADJUSTING MECHANISM

BACKGROUND OF THE INVENTION

The present invention relates to a control cable length self-adjusting mechanism which, specifically, is applicable to the adjustment of the length of sheathed steel cables which are regularly used in control and regulation devices and, in particular, to the automobile industry.

Sheathed steel control cables are widely used in the automobile industry as a means linking devices such as, for example, the clutch pedal and the plate operating lever, or in automatic gear change controls, connecting the gear change lever to the gearbox. The control cables are usually designed for mounting with a small number of operations in the motor vehicle. Such control cables, which are dimensioned and provided at the ends thereof with corresponding connection terminals adapted to each particular application, incorporate a control cable length self-adjusting device for compensating the variations which arise during the assembly process in each particular vehicle with regard to the theoretical distance between the mechanisms connected by said cable.

The self-adjusting device performs the function of automatically regulating and setting the optimum length of the control cable during the assembly of the latter in the vehicle, once attached by way of the connection terminals disposed at the respective ends to the mechanisms it connects, with the said self-adjusting device being anchored to a fixed point of the motor vehicle structure.

The known embodiments of control cable length self-adjusting devices comprise all or some of the following operative members:

- a main body member through which an adjusting stud may suitably slide. This is provided with a retaining screw thread and is firmly attached at one end thereof to the sheath of the steel cable. The steel cable, unsheathed, may slide longitudinally through the adjusting stud. The main body member is provided with mechanical means allowing it to be anchored to a fixed point of the motor vehicle structure.
- retaining means disposed inside the main body member. These means operate on the adjusting stud so as to set the position thereof relative to the said fixed point.
- and a control spring coaxially disposed relative to the adjusting stud. This spring presses permanently against the main body member and against the adjusting stud at the end thereof attached to the steel cable sheath.

The above described control cable length self-adjusting devices are supplied with the control spring compressed. Under these conditions, the devices operate as follows: when the control cable is attached by the terminals at both ends to the mechanisms it connects and the main body member is anchored to a fixed point on the vehicle structure, the adjusting stud is released from the retaining means and under the urging of the control spring it establishes the appropriate length of the sheathed steel cable between the adjusting stud and the corresponding mechanism. Thereafter the new position of the adjusting stud relative to the fixed point is set with the retaining means, with the control cable length being appropriately set in this way for the appropriate functioning of the mechanisms connected thereby.

As an embodiment of said control cable length self-adjusting devices, there may be cited Spanish patent P 8803905 for "Control cable tension self-adjusting device" which, comprises all the operative members described above.

Generally speaking, the known embodiments of control cable length self-adjusting devices have all or some of the following drawbacks limiting their operativity:

(a) they require tools for manipulating the retaining means mounted in the main body member which operate on the adjusting stud during the operations of adjusting and setting the control cable length; and (b) the manipulating on the retaining means during the operations of adjusting and setting the control cable length is transversal to the axis defined by the adjusting stud.

Such limitations cause an increase of the cost of installation of the control cables in all those cases in which the self-adjusting device is located, for needs derived from the design and/or location of the devices connected by the control cable, in points of the motor vehicle structure of difficult and/or limited access which greatly hinder the use of tools under appropriate conditions and/or there is not sufficient space to work transversely on the retaining means operating on the adjusting stud.

SUMMARY OF THE INVENTION

It is therefore an object of the present invention to provide a control cable length self-adjusting device which does not require the use of tools during the control cable length adjusting and setting operations, so that the retaining means should be operable during said operations longitudinally relative to the axis of the adjusting stud.

The control cable length self-adjusting device of the invention has a main body member snugly housing the mechanical retaining means for the adjusting stud passing therethrough and provided with means allowing it to be anchored to a fixed point of the motor vehicle structure; an adjusting stud which is formed externally with a retaining screw thread suitably dimensioned relative to the tensile demands made thereon and which snugly receives at one end thereof the corresponding end of the sheath of the steel cable to which it is firmly attached, said steel cable being capable of sliding, unsheathed, suitably longitudinally through the adjusting stud and having at said end a perimetral flange against which the control spring presses; a control spring coaxially disposed around the adjusting stud and pressing permanently against the perimetral flange of the adjusting stud. It is characterized in that the main body member is essentially and hollow and is formed on one of the main surfaces thereof, with a centrally disposed extension which extends outwardly over a sufficient distance and the dimensions and external configuration of which allow said main body member to be anchored to a fixed point of the motor vehicle structure, said extension and main body member being traversed completely by a longitudinal through-hole through which the adjusting stud may snugly slide, said through-hole defining inside said main body member an elongate recess suitably dimensioned as a seat for the adjusting stud and facing a centrally disposed upper opening;

on the other main surface, opposite the first named, with the inlet port of the longitudinal through-hole; and on the remaining two side surfaces of the main body member, suitably disposed relative to said through-hole, with corresponding facing apertures of essentially quadrangular perimeter, the respective upper sides of which are traversed by respective channel-like notches.

The retaining means for the adjusting stud are formed by:

actuating means, and an essentially right parallelepipedic retaining spring member suitably dimensioned snugly to slide inside the main body member and which is formed, on one major longitudinal surface thereof, with a centrally disposed transverse notch having a curved perimeter provided with a retaining screw thread dimensioned to mate with the retaining screw thread formed on said adjusting stud, and two suitably dimensioned tabs tangentially angularly disposed to the transverse notch and which may press permanently against the main body member and, on the opposite surface to the former, a transverse positioning notch.

The said actuating means are formed by an actuating shaft, snugly disposed in the main body member transversally to the axis of the centrally disposed extension formed thereon and superimposed on the retaining spring member, and which is formed, at both ends thereof, with corresponding perimetral flanges, which act as dogs to prevent it from coming out of the main body member and, in the portion formed by the width of the transverse positioning notch formed in the retaining spring member, a radial actuating extension which may act on the retaining spring member so that a rotation of said actuating shaft in a sufficient distance longitudinally relative to the axis defined by the adjusting stud causes, in one direction, the retaining spring member to move closer to the adjusting stud, the latter being fixed in position under the combined action of the retaining screw threads formed thereon, while, the rotation of the actuating shaft in the opposite direction causes the retaining spring member to move away from the adjusting stud, thereby releasing it from the combined action of the retaining screw threads formed thereon:

a radial extension extending from the actuating shaft for facilitating operation of said shaft; and a positioning shoulder formed externally on the main body member in functional correspondence with the radial extension extending from the actuating shaft, said positioning shoulder being adapted to set the position of said radial extension in which the position of the adjusting stud is set.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The control cable length self-adjusting mechanism is represented in the sheet of drawings accompanying the present specification. In the drawings:

FIG. 1 is a cross section view of the mechanism of the invention, the adjusting stud being in the position set at origin.

FIG. 2 is a cross section view on the line II—II of FIG. 1.

FIG. 3 is a cross section view of the mechanism of the invention, showing a position occupied by the adjusting stud during the operations of adjusting the length of the sheathed steel cable.

FIG. 4 is a cross section view on the line IV—IV of FIG. 3.

FIG. 5 is a cross section view of the mechanism of the invention showing the fixing of the adjusting stud once the control cable length has been adjusted.

DETAILED DESCRIPTION OF THE PREFERRED EMBODIMENT

The control cable length self-adjusting mechanism of the invention described as an example has, as shown in FIGS. 1, 3 and 5, the main body member CP conveniently housing the adjusting stud VR and the retaining means MR, and by the control spring RR.

The main body member CP and the retaining means MR are preferably made from plastics material of appropriate mechanical properties, while the adjusting stud VR is preferably made from metallic materials.

As shown in all the Figures, the main body member CP is hollow. One of the ends thereof is provided, in this embodiment, with a curved extension 1 for structural reinforcement. The main body member CP is formed on one of the sides thereof with the centrally disposed cylindrical extension 2, shown in FIGS. 1, 3 and 5, which is formed externally with three perimetral ribs 3. The cylindrical extension 2 and perimetral ribs 3 are provided for anchoring the main body member CP to a fixed point of the motor vehicle structure which, for greater clarity of illustration, has not been shown in the drawing sheet.

The main body member CP is provided with the through-hole 4 centrally disposed relative to the longitudinal axis defined by the centrally disposed cylindrical extension 2 so that the adjusting stud VR may slide snugly through the hole 4 as shown in all the Figures.

The through-hole 4 defines in the main body member CP the recess 5, shown in detail in FIGS. 2 and 4, which acts as a seat for the adjusting stud VR.

The main body member CP is also formed with the centrally disposed upper opening 6, shown in detail in FIGS. 1, 3 and 5, allowing retaining means MR to slide snugly therethrough during the operations inherent to the mechanism of the invention, of fixing and regulating the control cable length.

The quadrangular openings 7 face each other and are suitably disposed relative to the axis defined by the through-hole 4 of the centrally disposed cylindrical extension 2, as shown in detail in FIGS. 2 and 4. Said openings 7 have channels 8, on the sides proximate the surface of the main body member CP facing the surface formed with the recess 5. The openings 7 and channels 8 allow the MR to be snugly housed in the interior of the main body member CP.

The adjusting stud VR is externally formed over a sufficient length with a retaining screw thread 9, and, at one end thereof, with the housing 10 and the perimetral flange 11 as shown in detail in FIGS. 1, 3 and 5. The housing 10 is provided for snugly receiving and firmly fixing the end E of the sheath 12 of the steel cable 13 and one end of the control spring RR which presses permanently against the perimetral flange 11.

The longitudinal through-bore 14, shown in FIGS. 2 and 4, of the adjusting stud VR is dimensioned such that the steel cable 13 may snugly slide therethrough.

The retaining means MR are constituted by the retaining spring member 15 and by the actuating shaft 16.

The retaining spring member 15 is essentially parallelepipedic and is formed with the transverse notch 17 having the same radius as the adjusting stud VR. The transverse notch is formed with the retaining screw thread 18 which is dimensioned to mate with the retaining screw thread 9 formed on the adjusting stud VR.

FIGS. 2 and 4 show how the retaining spring member 15 is also formed with the two tabs 19. The tabs are tangentially angularly disposed relative to the transverse notch 17 provided with the retaining screw thread 18 and, on the opposite side, the transverse positioning notch 20.

The actuating shaft 16 is provided with two perimetral flanges 21 which act as retainers. As shown in FIGS. 2 and 4, they prevent the actuating shaft 16 from coming out of the main body member CP when it is located in the main body member CP and superimposed on the retaining spring member 15.

FIGS. 1, 2 and 5 show how the actuating shaft 16 is formed with. Its radial actuating extension 22, the size snugly corresponds to that of the transverse positioning notch 20 of the retaining spring member 15. The radial actuating extension 22 may actuate the retaining spring member is by pressing against it.

In this embodiment, the actuating shaft 16 is provided with. Its bent prolongation 23, the free end is formed with the widened portion 24 to facilitate the operations for adjusting and fixing the length of the sheathed steel cable 12-13 for the user.

The main body member CP is formed with the positioning projection 25, shown in all the Figures and in detail in FIGS. 2 and 4, for setting the position occupied by the bent prolongation 23 and, consequently, the position of the actuating shaft 16 once the position of the adjusting stud VR has been set. Thereby the adjusting stud VR is prevented from extemporaneously being released during the operations prior to assembly of the mechanism of the invention or when it is mounted in the vehicle, with the consequent loss of the previously established adjustment of the length of the sheathed steel cable 12-13.

The control cable length self-adjusting mechanism of the invention works as follows:

The mechanism is originally supplied as shown in FIG. 1. Under these conditions, the control spring RR is fully compressed and the adjusting stud VR is fixed by the action of the retaining spring member 15 by respective retaining screw threads 9 and 18.

Once the mechanism of the invention has been mounted at a fixed point of the motor vehicle structure and the respective ends have been attached to the mechanisms connected by the steel cable 13, not shown in the drawings for the same reasons as stated hereinbefore, the actuating shaft 16 is longitudinally rotated by means of the bent prolongation 23 and widened portion 24 provided therefor, relative to the axis defined by the adjusting stud VR in a sufficient distance. This causes, as shown in FIGS. 3 and 4, the release of the adjusting stud VR from the retaining screw thread 18 of the retaining spring member 15 in view of the action of the two tabs 19, formed on said retaining spring member 15, which press against the corresponding inner surface of the main body member CP separating the said retaining spring member 15 and adjusting stud VR in a sufficient distance. The length of the portion of sheathed steel cable 12-13 is adjusted by the action of the control spring RR which presses permanently against the main body member CP and against the perimetral flange 11 of the adjusting stud VR, moving the latter longitudinally in the distance required by each particular application.

Once the length of the control cable has been adjusted, the rotation of the actuating shaft 16 again longitudinally relative to the axis defined by the adjusting stud VR by means of the bent prolongation 23 and widened portion 24, returning it to the initial position, as shown in FIGS. 2 and 5, will fix the adjusting stud VR in the new position by means of the retaining screw thread 18 of the retaining spring member 15 since the latter is pressed by the radial actuating extension 22 of the actuating shaft 16.

Under these conditions, as under the initial ones previously described, the position occupied by the bent prolongation 23 of the actuating shaft 16 is in turn fixed, preventing extemporaneous release with the consequent loss of the control cable length adjustment, by the action of the positioning projection 25 formed on the main body member CP as shown in detail in FIGS. 1, 2 and 5.

It will be understood that each of the elements described above, or two or more together, may also find a useful application in other types of constructions differing from the types described above.

While the invention has been illustrated and described as embodied in a control cable length self-adjusting mechanism, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A control cable length self-adjusting device, comprising a main body member having means for anchoring to a motor vehicle structure; an adjusting stud through which an unsheathed steel cable can longitudinally slide and which has one end arranged for receiving a sheath of the steel cable and having a peripheral flange; mechanical retaining means provided for retaining said adjusting stud; and spring means permanently pressing said adjusting stud, said main body member being hollow; said main body having one main surface provided with a central longitudinal extension which carries said means for anchoring to a motor vehicle structure, said extension and said main body having a longitudinal through hole through which said adjusting stud can snugly slide and which has an elongated recess forming a seat for said adjusting stud and also has a central upper opening, said main body member having another main surface which is opposite to said first mentioned main surface and has an inlet port of said longitudinal through hole, said main body member also having two remaining side surfaces provided with substantially quadrangular apertures and transverse channel-like notches, said adjusting stud having a retaining screw thread, said retaining means for said adjusting stud includes actuating means, and a substantially parallelepipedic retaining spring member sliding inside said main body member and having a centrally disposed transverse notch provided with a retaining screw thread which cooperates with said retaining screw thread of said adjusting stud, said retaining spring member also having two tabs extending tangentially angularly relative to said transverse notch and pressing permanently against said main body member.

2. A control cable length self-adjusting device as defined in claim 1, wherein said control spring means is arranged around said adjusting stud.

3. A control cable length self-adjusting device as defined in claim 1, wherein said retaining spring member has a surface which is opposite to said tabs and provided with a transverse positioning notch.

4. A control cable length self-adjusting device as defined in claim 3, wherein said actuating means has an actuating shaft arranged in said main body member transversely to said extension and superposed on said retaining spring member, said actuating shaft having ends provided with peripheral flanges which prevent coming out of said actuating shaft from said main body member, said actuating shaft also having a radial actuating extension extending in said positioning notch so that a rotation of said actuating shaft relative to said adjusting stud in one direction causes said retaining spring member to move closer to said adjusting stud so as to fix said adjusting stud in position under the action of retaining screw threads, while a rotation of said actuating shaft in an opposite direction causes said retaining spring member to move away from said adjusting stud so as to release said adjusting stud from the action of said retaining screw threads.

5. A control cable length self-adjusting device as defined in claim 4, wherein said actuating means having a radial extension extending from said actuating shaft for facilitating operation of said shaft, and a positioning shoulder provided on said main body member in correspondence with said radial extension and adapted to set opposition of said radial extension so as to fix said adjusting stud.

6. A control cable length self-adjusting device, comprising a main body member having means for anchoring to a motor vehicle structure; an adjusting stud through which an unsheathed steel cable can longitudinally slide and which has one end arranged for receiving a sheath of the steel cable and having a peripheral flange; mechanical retaining means provided for retaining said adjusting stud; and spring means permanently pressing said adjusting stud, said main body member being hollow; said main body having one main surface provided with a central longitudinal extension which carries said means for anchoring to a motor vehicle structure, said extension and said main body having a longitudinal through hole through which said adjusting stud can snugly slide and which has an elongated recess forming a seat for said adjusting stud and also has a central upper opening, said main body member having another main surface which is opposite to said first mentioned main surface and has an inlet port of said longitudinal through hole, said main body member also having two remaining side surfaces provided with substantially quadrangular apertures and transverse channel-like notches, said retaining means for said adjusting stud includes a retaining spring member sliding inside said main body member and having a centrally disposed transverse notch which cooperates with said adjusting stud and two tabs extending tangentially angularly relative to said transverse notch and pressing permanently against said main body member.

* * * * *